United States Patent [19]
Conway

[11] Patent Number: 5,980,037
[45] Date of Patent: Nov. 9, 1999

[54] ELECTRIC CONNECTION CONFIGURATION FOR ELECTRO-OPTICAL DEVICE

[75] Inventor: Simon M. Conway, Lima, N.Y.

[73] Assignee: Luxottica Leasing S.p.A., Agordo, Italy

[21] Appl. No.: 09/018,551

[22] Filed: Feb. 4, 1998

Related U.S. Application Data

[60] Provisional application No. 60/038,827, Feb. 6, 1997.

[51] Int. Cl.⁶ .................................................. G02C 7/12
[52] U.S. Cl. ............................................ 351/49; 351/158
[58] Field of Search ................................ 351/158, 41, 49, 351/44, 45, 46

[56] References Cited

U.S. PATENT DOCUMENTS

| | | | |
|---|---|---|---|
| D. 275,961 | 10/1984 | Markovitz | D16/112 |
| D. 321,701 | 11/1991 | Nomura | D16/102 |
| 4,279,474 | 7/1981 | Belgorod | 350/331 |
| 4,462,661 | 7/1984 | Witt | 350/331 |
| 4,756,605 | 7/1988 | Okada | 350/347 |
| 4,795,248 | 1/1989 | Okada | 351/158 |
| 4,848,890 | 7/1989 | Horn | 351/44 |
| 4,968,127 | 11/1990 | Russell | 351/44 |
| 4,991,951 | 2/1991 | Mizuno | 351/41 |
| 5,015,086 | 5/1991 | Okaue | 351/44 |
| 5,067,795 | 11/1991 | Senatore | 359/84 |
| 5,114,218 | 5/1992 | Black | 351/44 |
| 5,382,986 | 1/1995 | Black | 351/158 |
| 5,552,841 | 9/1996 | Gallorini | 351/49 |

FOREIGN PATENT DOCUMENTS

| | | | |
|---|---|---|---|
| 2684770 | 6/1993 | France | G02C 5/02 |
| 1563929 | 4/1980 | United Kingdom | G02C 7/10 |
| 94/00789 | 1/1994 | WIPO | G02C 7/10 |

*Primary Examiner*—Hung Xuan Dang
*Attorney, Agent, or Firm*—Katherine McGuire

[57] ABSTRACT

An electric connection configuration for an electro-optical device comprises a brow bar member which houses the electronics of the device, and a pair of flexible conductor tabs which attach to the electronics in the housing and extend therefrom to form electrodes for connection to the lenses. When the brow bar is attached to the frame, the conductor tabs hang over the frame and extend within the space formed by the eye openings of the frame. As the lenses are fitted into a respective eye opening, the flexible conductor tabs are folded back such that they become sandwiched between the edge of the lens and the frame. In a preferred embodiment, the flexible conductor tabs each form a positive electrode, and a pair of screws, which also serve to attach the brow bar to the frame, each form a negative electrode for attachment to a respective lens.

12 Claims, 4 Drawing Sheets

FIG. 3a
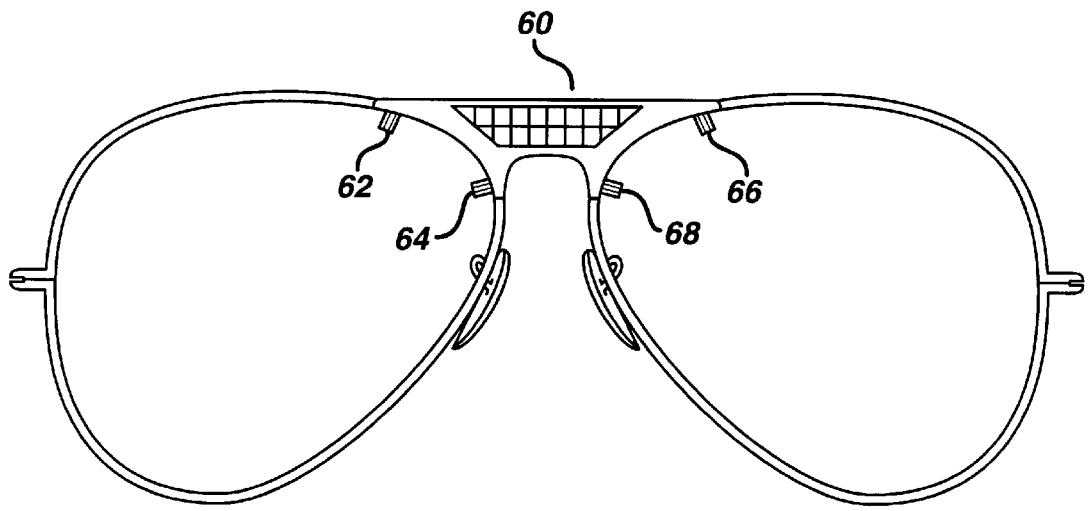
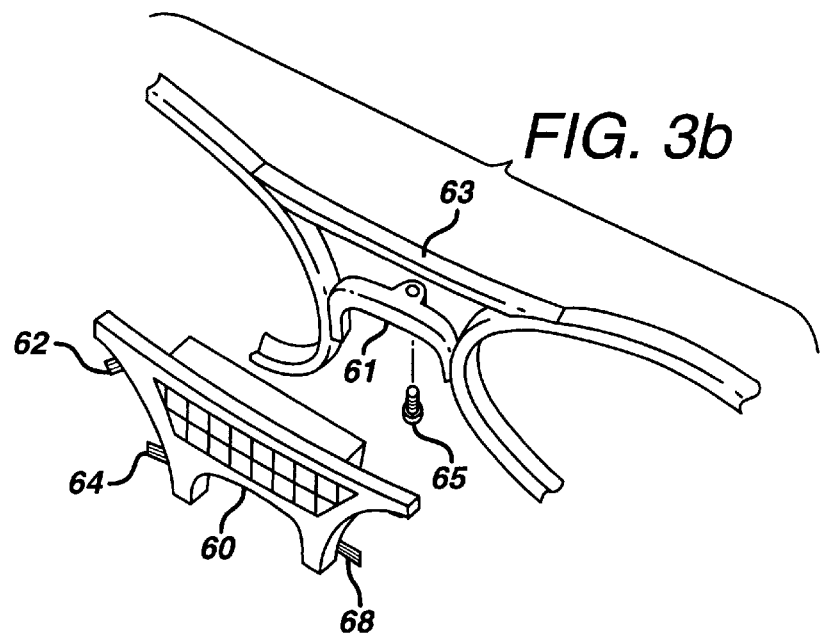
FIG. 3b

ELECTRIC CONNECTION CONFIGURATION FOR ELECTRO-OPTICAL DEVICE

This application claims benefit of provisional application No. 60/038,827, filed Feb. 6, 1997.

BACKGROUND OF THE INVENTION

The present invention relates to electro-optical devices. More particularly, the present invention relates to an electrical connection configuration of the electronics of an electro-optical device to the lenses of an eyewear.

Electro-optical devices providing electric current to an eyewear lens are known, a sampling of which may be seen in the following U.S. patents:
U.S. Pat. No. 4,756,605 issued to Okada et al on Jul. 12, 1988
U.S. Pat. No. 4,795,248 issued to Okada et al on Jan. 3, 1989
U.S. Pat. No. 4,848,890 issued to Horn on Jul. 18, 1989
U.S. Pat. No. 4,968,127 issued to Russell et al on Nov. 6, 1990
U.S. Pat. No. 4,991,951 issued to Nikon Corp. on Feb. 12, 1991
U.S. Pat. No. 5,067,795 issued to Senatore on Nov. 26, 1991
U.S. Pat. No. 5,114,218 issued to Black et al on May 19, 1992
U.S. Pat. No. 5,552,841 issued to Gallorini et al on Sep. 3, 1996

The above patents shown and discuss a variety of electro-optical devices including devices which can alter the transparency of an eyewear lens (e.g., electrochromic and liquid crystal devices), devices which can prevent dewing of the lens (e.g., transparent heat resistor) and devices which can automatically change the color of a lens (e.g. as seen in the '218 patent). In all electro-optical devices, the power source and electric circuit must, of course, be electrically connected to the lenses of the eyewear. In the sampling of electro-optical devices discussed above, the location and manner by which this is accomplished varies considerably. For example, in the '890 and '605 patents, the power source and certain electronic components are contained within the temples of the eyewear which contain wire leads traveling through the hinge area to the front frame and finally to the lenses of the eyewear. Eyewear temples have been typically chosen in the past to house batteries due to the size of the batteries, depending on the type of battery employed. If the power source and/or circuitry is contained within the temple portions, an electric pathway must be established through the hinge area to reach the lenses contained in the front frame. However, the manner by which the electric leads are fed through the hinge area of an eyewear is notoriously difficult due to the repeated opening and closing cycles of the temple, and the deleterious wearing effect this imparts on the electric leads. This problem is addressed, in part, by U.S. Pat. No. 4,991,951 to Nikon which uses a split metal eyewear frame to supply the electric path to the lenses, with the negative traveling through the bottom half of the frame and lens and the positive traveling through the upper half of the frame and lens. Since the upper and bottom halves of the frame are mutually electrically insulated and used as the electric pathway, no separate wire leads are necessary. While the Nikon patent solves the problem of passing electric leads through the hinge area of an eyewear, the requirement of a specially configured, split framework for the eyewear is a drawback which imposes added cost and significant design restraints on the eyewear.

With the advent of miniaturized batteries and electronics (e.g., integrated circuit designs), the power source and circuitry may be positioned entirely within the front frame thereby negating the need for separate electric leads through the hinge area of the eyewear. Examples of this type of arrangement may be seen in the following U.S. patents:
U.S. Pat. No. 4,279,474 issued to Belgorod on Jul. 21, 1981
U.S. Pat. No. 4,462,661 issued to Instrument Flight Research on Jul. 31, 1984
U.S. Pat. No. 5,015,086 issued to Seiko Epson Corp. on May 14, 1991
U.S. Pat. No. 5,114,218 (see above)

In each of the above patents, the power source and/or electronic circuit is permanently integrated into the eyewear frame, usually requiring some special adaptation of the frame to accommodate the electrical components. This again involves added cost to the eyewear product and imposes significant design restraints on the appearance and other functionality of the final eyewear product.

SUMMARY OF THE INVENTION

The present invention addressees the above described drawbacks of establishing an electric pathway from a power source to the lens in an electro-optical device. More particularly, the invention comprises a unitary brow bar member which houses the power source and circuitry which operates the electro-optical device. The unitary brow bar member further includes a pair of spaced, flexible conductor tabs, preferably in the form of a "flex circuit", which are electrically connected to the circuitry contained in the brow bar. The electro-optical device is assembled by attaching the brow bar to the eyewear front frame in the vicinity of, and preferably above, the bridge area of the frame (which itself may be formed of any desired material such as plastic or metal). When the brow bar is thusly attached to the frame, the two conductor tabs hang loosely from the brow bar, extending over the frame in the area of a respective eye opening of the frame. The lenses are then inserted into the eye openings with the conductor tabs being folded back and sandwiched between the edge of the lens and the eye opening groove which secures the lens in the eye opening. The conductor tabs each carry a lead which becomes electrically connected to the lens upon inserting the lens into the eye opening with the tab folded back as described above. In the preferred embodiment, the conductor tabs each carry a positive lead, and the negative leads of the circuit are connected to a respective lens by a pair of screws which are also used to secure the brow bar to the frame, extending through holes formed in the frame at each eye opening, respectively. In this manner, the frame of the eyewear needs no special adaptation to establish an electric connection between the power source and electronics of the electro-optical device, and the lenses of the eyewear.

BRIEF DESCRIPTION OF THE DRAWINGS

FIG. 3a is a front, elevational view of a third embodiment of the brow bar member on the front frame;

FIG. 3b is a perspective view thereof showing the manner of attaching the brow bar member to the front frame;

DETAILED DESCRIPTION

Figure 1A:
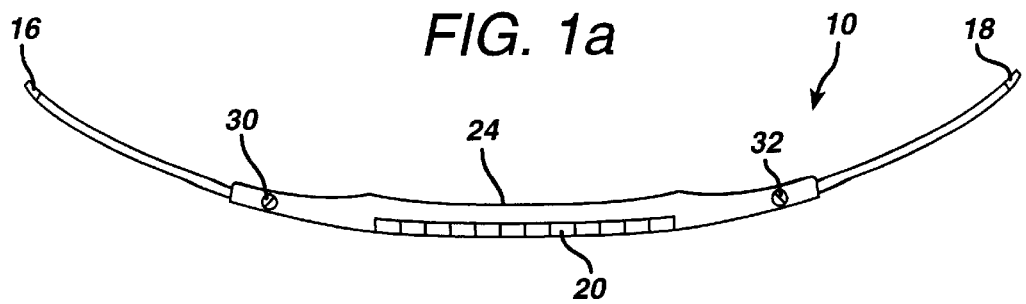
FIG. 1a is a top plan view of an eyewear front including the brow bar of the present invention attached thereto.

Referring first to FIGS. 1(a–c), there is seen an eyewear front frame 10 having right and left eyewires 12 and 14 (as worn), respectively, interconnected by a bridge 16. Temple members (not shown) are pivotally connected to end pieces 16,18 provided at either end of front frame 10.

The eyewear of the present invention incorporates an electro-optical device which alters a predetermined characteristic of the lenses which are secured within the eyewires 12,14. Examples of electro-optical devices which may be utilized by the present invention are given in the Background section hereof. Two common electro-optical devices are electrochromic and liquid crystal lenses which alter the transparency of the lenses in correlation with the amount of ambient light striking the eyewear.

Figure 1B:
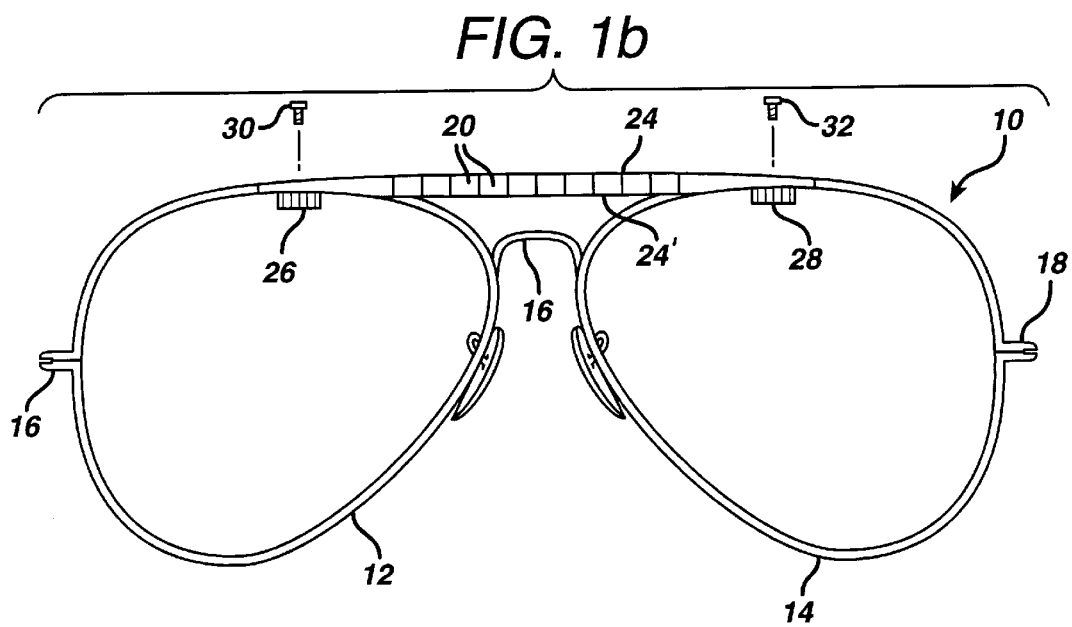
FIG. 1b is a front, elevational view thereof showing the manner of attaching the brow bar member to the frame.

The present invention facilitates electric connection of the power source and electronics to the lenses of the electro-optical device by providing a unitary brow bar member 24 which houses both the power source and electronics of the electro-optical device. A pair of conductor tabs 26,28, preferably comprising a flex circuit, are provided adjacent either end of the bottom edge 24' of brow bar member 24. Conductor tabs 26,28 establish electric connection between the power source and electronics held within brow bar member 24 and the lenses held in eyewires 12,14, and may do so automatically upon inserting the lenses into their respective eyewires 12,14. More particularly, it is seen in FIG. 1b that conductor tabs 26,28 hang loosely from the attached brow bar member and extend within the space defined by eyewires 12,14. As the lenses are inserted within the eyewires, the conductor tabs are folded back and are sandwiched between the lens edge and the respective eyewire 12,14, thereby establishing the desired electric contact between the electronics housed in the brow bar member and the lens.

Figure 1C:
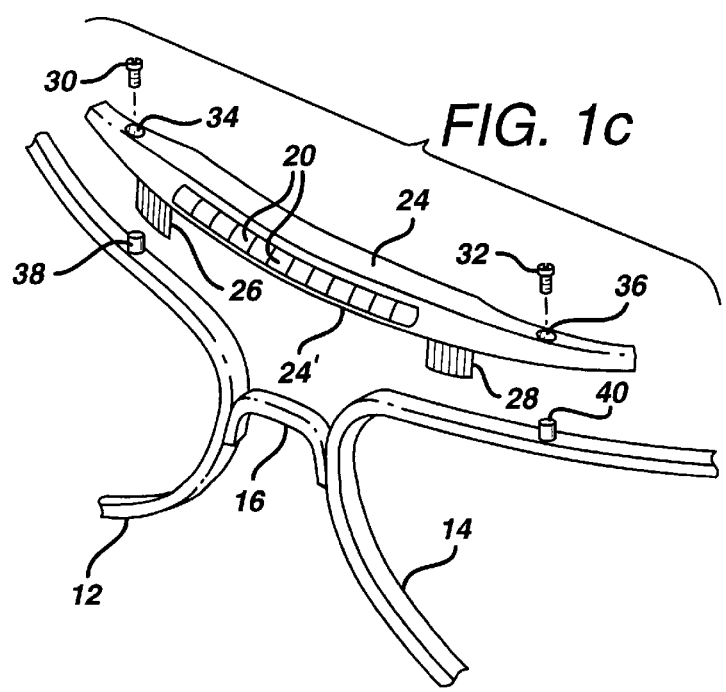
FIG. 1c is a perspective view thereof.

The conductor tabs 26,28 may carry one or all of the different electric leads which need to be connected to the lens (which is dictated by the requirements of the particular electro-optical device being utilized). The conductor tabs themselves are covered in an insulated material such that a portion of the material may be removed to establish an electrode connection between the tab and lens at the appropriate location on the lens while maintaining the necessary insulation from the frame. In the embodiment of FIGS. 1(a–c), the conductor tabs 26,28 each carry a positive lead from the electronics held in the brow bar member 24 to the lens held in eyewires 12,14, while the corresponding negative leads are established by a pair of screws 30,32. As seen in FIG. 1(c), screws 30,32 pass through aligned holes 34,36 and 38,40 formed in brow bar member 24 and eyewires 12,14, respectively, to serve the dual purpose of securing brow bar member 24 to front frame 10 while also establishing a negative electrode connection to the lenses. Each screw 30,32 makes contact with a respective negative lead of the electronics inside the brow bar member 24.

The power source for the electro-optical device is carried by brow bar member 24 as stated above, and may be of any desired type. In the embodiments shown and described herein, the power source is an array of solar cells 20 exposed on the outer surface of the brow bar member with an appropriate connection being made to the electronics held inside the brow bar member.

Figure 2A:
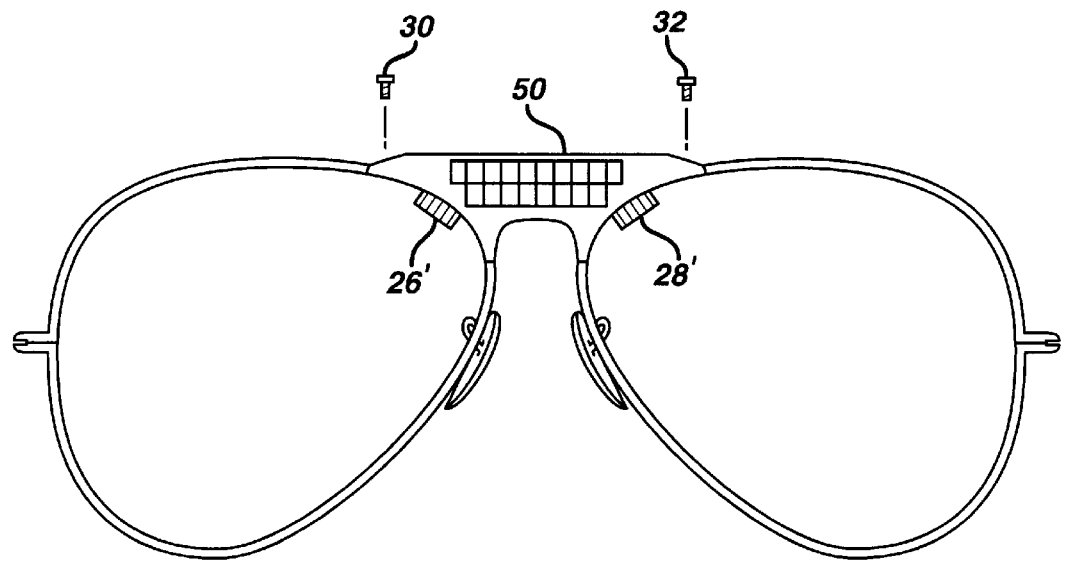
FIG. 2a is a front, elevational view of second embodiment of the brow bar member.
Figure 2B:
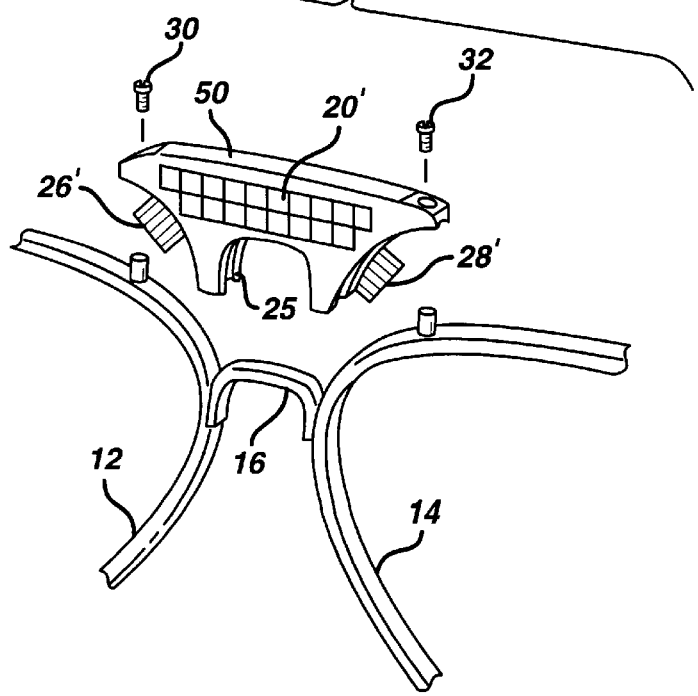
FIG. 2b is a perspective view thereof showing the manner of attaching the brow bar member to the front frame.

A second embodiment of brow bar member is shown in FIGS. 2a and b where two rows of solar cells 20' are provided on the brow bar member 50 which also includes a U-shaped section 25 which may be slid over and conceal the bridge 16 of the front frame 10. Also, it will be noticed conductor tabs 26',28' are provided at a location closer to the bridge 16 than in the embodiment of FIGS. 1(a–c).

A third embodiment of brow bar member 60 is shown in FIGS. 3a and b where two pairs of conductor tabs 62,64 and 66,68 are provided, with each pair carrying a positive and negative lead to each lens, respectively. Brow bar member 60 includes a back plate 60' which extends between bridge members 61 and 63, with a screw 65 securing brow bar member 60 to the frame.

Figure 4A:
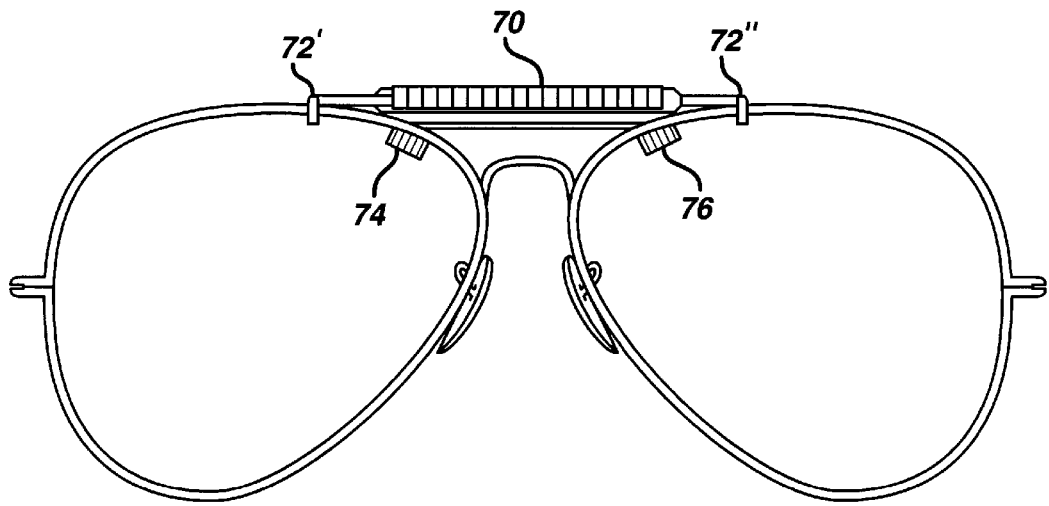
FIG. 4a is a front, elevational view of a fourth embodiment of the brow bar member attached to the front frame.
Figure 4B:
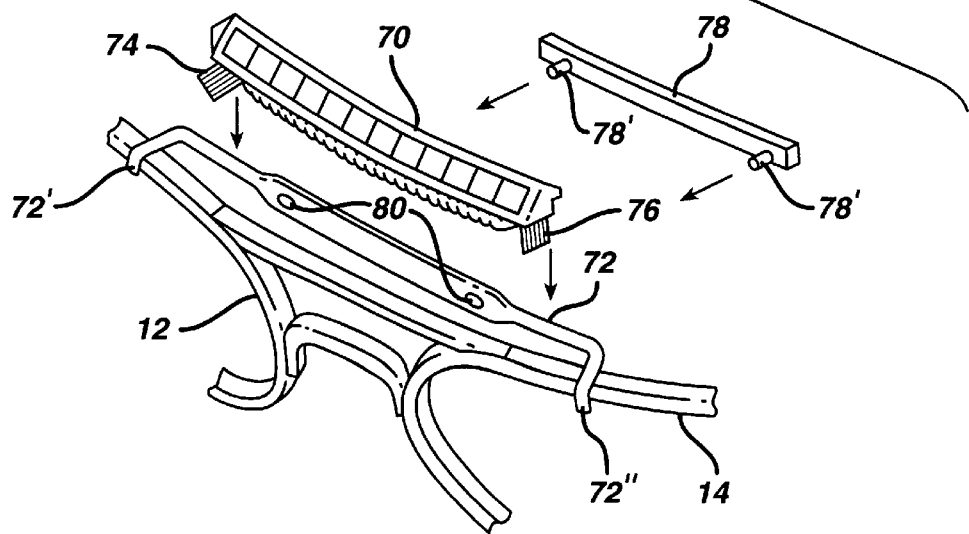
FIG. 4b is a perspective view thereof showing the manner of attaching the brow bar member to the front frame.

A fourth embodiment of brow bar member is shown in FIGS. 4a and b wherein the solar panel 70 which houses the electronics is separate from the brow bar 72 which itself is soldered, brazed, or otherwise attached at either end 72',72" thereof to eyewires 12,14, respectively. Conductor tabs 74,76 are provided at either end of solar panel 70 and extend within the eyewire openings, to be folded back upon insertion of the lens in the eyewire as described previously. In the embodiment of FIG. 4, conductor tabs 74,76 connect with the positive leads of the circuitry in solar panel 70. Solar panel 70 is attached to brow bar 72 by a back plate 78 which includes a pair of bosses 78' which align with and extend through a pair of spaced holes 80 formed in brow bar 72. The negative connection to the lenses is provided by brow bar 72 which electrically connects to the electronics held in solar panel 70 via back plate 78, and leads to the lenses through either end 72',72" of brow bar 72.

There is thus provided an electric connection configuration for an electro-optical device which does not require any special adaptation of the frame to establish an electric pathway from the power source and electronics to the lenses of the device.

What is claimed is:

1. An electric connection configuration for an electro-optical device having a frame formed at least in part by first and second eyewires, said eyewires adapted to secure a pair of lenses therein, said configuration comprising:

a) a brow bar member forming a housing wherein electronics for operating said electro-optical device are contained;

b) first and second, flexible connector tabs attached to said brow bar and electrically connected at first ends thereof to said electronics held within said housing, said first and second connector tabs extending from said brow bar, over said frame and folded back and secured between a respective said eyewire and lens, said first and second connector tabs each forming at least one electrode connection between said electronics in said housing and a respective said lens.

2. The electric connection configuration of claim 1, and further comprising a pair of screws which secure said brow bar member to said frame and establish a second electrode connection between said electronics in said housing and a respective said lens.

3. The electric connection configuration of claim 2 wherein each said flexible connector tabs forms a positive electrode and each said screw forms a negative electrode for a respective said lens.

4. The electric connection configuration of claim 1, and further comprising third and fourth flexible connector tabs attached to said brow bar and spaced from said first and second connector tabs, respectively, said third and fourth connector tabs electrically connected to said electronics in said housing and extending from said brow bar, over said frame and folded back and secured between a respective said eyewire and lens, said third and fourth connector tabs each forming a second electrode connection between said electronics in said housing and a respective said lens.

5. The electric connection configuration of claim 4 wherein said first and third flexible conductor tabs form the positive and negative electrode for one of said lenses, and said second and fourth flexible conductor tab form the positive and negative electrode for the other of said lenses, respectively.

6. The electric connection configuration of claim 4 wherein said frame includes a bridge area and said brow bar member includes a U-shaped portion which fits over and conceals said bridge area of said frame.

7. The electric connection configuration of claim 1, wherein said brow bar member includes a solar panel power source electrically connected to said electronics in said housing.

8. The electric connection configuration of claim 7 wherein said housing, including said solar panel and electronics, is separable from said brow bar member, said brow bar member being elongated and having first and second, opposite ends attached to said first and second eyewires, respectively, said first and second conductor tabs forming first and second electrodes for a respective said lens, and said first and second ends of said brow bar forming third and fourth electrodes for a respective said lens.

9. The electric connection configuration of claim 8, and further comprising a back plate having first and second bosses which extend through a respective pair of holes formed in said brow bar member for attaching said housing to said brow bar member.

10. A method of electrically connecting an electro-optical device to an eyewear frame having first and second eyewires, said method comprising:

a) providing a housing in the form of a brow bar member;
   b) placing the electronics in said housing;
   c) electrically connecting first ends of first and second flexible conductor tabs to said electronics in said housing with said flexible conductor tabs having second ends extending from said housing;
   d) attaching said brow bar member to said frame with said first and second flexible conductor tabs extending over a respective one of said first and second eyewires; and
   e) inserting a pair of lenses into said first and second eyewires while folding back said first and second flexible conductor tabs such that said first and second conductor tabs become sandwiched between said the edge of a respective said lens and eyewire, said first and second flexible conductor tabs each forming at least one electrode connection to a respective said lens.

11. The method of claim 10, and further comprising the step of:

attaching said brow bar member to said frame with first and second screws, said first and second screws also forming third and fourth electrode connections, of opposite polarity than said at least one electrode connection of said flexible conductor tabs, for electric connection to a respective said lens.

12. The method of claim 10, and further comprising the steps of:

f) providing third and fourth flexible conductor tabs, each having first ends connected to said electronics in said housing with said third and fourth flexible conductor tabs having second ends extending from said housing, over said frame and extending within the space formed by said first and second eyewires, respectively; and
   g) folding said third and fourth flexible conductor tabs back when inserting said lenses into said first and second eyewires, respectively, such that said third and fourth flexible conductor tabs become sandwiched between a respective said lens and eyewire, said third and fourth flexible conductor tabs forming third and fourth electrodes, of opposite polarity than said first and second flexible conductor tabs, which electrically connect to said lenses, respectively.

* * * * *